(12) United States Patent
Morse et al.

(10) Patent No.: US 10,522,988 B2
(45) Date of Patent: Dec. 31, 2019

(54) CONDUIT OUTLET BODY AND METHOD OF USING SAME

(71) Applicant: Eaton Intelligent Power Limited, Dublin (IE)

(72) Inventors: Bradford J. Morse, Syracuse, NY (US); Joseph E. Platt, Baldwinsville, NY (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 15/923,638

(22) Filed: Mar. 16, 2018

(65) Prior Publication Data

US 2019/0288494 A1 Sep. 19, 2019

(51) Int. Cl.
*H02G 3/04* (2006.01)
*H02G 3/06* (2006.01)

(52) U.S. Cl.
CPC ......... *H02G 3/0481* (2013.01); *H02G 3/0418* (2013.01); *H02G 3/06* (2013.01)

(58) Field of Classification Search
CPC ............................... H02G 3/06; H02G 3/0481

USPC ........................................................ 174/481
See application file for complete search history.

(56) References Cited

U.S. PATENT DOCUMENTS

| 5,342,993 A * | 8/1994 | Siems | H02G 3/185 |
| | | | 174/481 |
| 6,580,029 B1 * | 6/2003 | Bing | H02G 3/0608 |
| | | | 174/24 |
| 7,825,335 B2 * | 11/2010 | Carbone | H02G 3/0493 |
| | | | 174/50 |
| 9,438,019 B2 * | 9/2016 | Plathe | H01R 13/74 |

OTHER PUBLICATIONS

Crouse-Hinds Products, Condulets, Groundulets Plugs and Receptacles, Catalog 2200, Nov. 1, 1929, 2 pages, Syracuse, New York, United States.

* cited by examiner

*Primary Examiner* — Dhiru R Patel
(74) *Attorney, Agent, or Firm* — Stinson LLP

(57) ABSTRACT

A conduit outlet body includes a body conduit, an axial hub, a transverse hub, and an access window that are integrally and monolithically formed as a single, one-piece component. The cross-sectional dimension of the transverse hub opening is different than the cross-sectional dimension of the axial hub opening.

20 Claims, 10 Drawing Sheets

US 10,522,988 B2

CONDUIT OUTLET BODY AND METHOD OF USING SAME

FIELD OF THE DISCLOSURE

The present disclosure generally relates to a conduit outlet body and a method of using the same.

BACKGROUND OF THE DISCLOSURE

Various electrical codes require in-conduit wiring for runs emanating from power boxes and terminating at termination points, such as receptacles and light fixtures, in or outside of a building. Commonly, the conduits are filled 20 to 40% capacity in new construction. These conduits are often installed before the interior of new construction is completed and may also be in place in existing construction—both interior and exterior uses.

As a part of the electrical building code, conduit runs include conduit outlet bodies typically placed every 100 feet or less and/or after every transverse 90 degree bend. One type of conduit outlet body is commercially available under the name CONDULET® and manufactured and sold by Eaton Corporation. Conduit outlet bodies provide access to the embedded wiring to assist and insure the reliability of wiring pulled through the conduit bodies and serve as junction points for internal wiring and afford access to embedded wiring if needed. Conduit outlet bodies have removable cover plates, and when the cover plate is removed, the internal wiring is accessible to an electrician, such as to obtain access for wire pulling or splicing purposes.

SUMMARY OF THE DISCLOSURE

In one aspect, a conduit outlet body has first and second axial ends, and an imaginary body axis extending between the first and second axial ends. The conduit outlet body generally comprises a body conduit defining an internal axial passage extending axially along conduit outlet body. An axial hub at the first axial end of the conduit outlet body defines an axial hub opening in communication with the internal axial passage. The axial hub opening has a cross-sectional dimension and an imaginary axial hub axis extending along the imaginary body axis. A transverse hub on the body conduit has a transverse hub opening in communication with the internal axial passage. The transverse hub opening has a cross-sectional dimension and an imaginary transverse axis extending transversely relative to the imaginary body axis. The transverse hub is configured to connect to a transverse electrical conduit so that the transverse electrical conduit is in communication with the internal axial passage. An access window on the body conduit defines an access opening in communication with the internal axial passage. The access opening has an imaginary access axis extending transversely relative to the imaginary body axis, and a length extending axially relative to the imaginary body axis. The body conduit, the axial hub, the transverse hub, and the access window are integrally and monolithically formed as a single, one-piece component. The cross-sectional dimension of the transverse hub opening is different than the cross-sectional dimension of the axial hub opening.

In another aspect, a conduit outlet body has first and second axial ends, and an imaginary body axis extending between the first and second axial ends. The conduit outlet body generally comprises a body conduit defining an internal axial passage extending axially along conduit outlet body. A first axial hub at the first axial end of the conduit outlet body defines a first axial hub opening in communication with the internal axial passage. The first axial hub opening has a cross-sectional dimension and a first imaginary axial hub axis extending along the imaginary body axis. A second axial hub at the second axial end of the conduit outlet body defines a second axial hub opening in communication with the internal axial passage. The second axial hub opening has a cross-sectional dimension and a second imaginary axial hub axis extending along the imaginary body axis. A transverse hub on the body conduit has a transverse hub opening in communication with the internal axial passage. The transverse hub opening has a cross-sectional dimension and an imaginary transverse axis extending transversely relative to the imaginary body axis. The transverse hub is configured to connect to a transverse electrical conduit so that the transverse electrical conduit is in communication with the internal axial passage. An access window on the body conduit defines an access opening in communication with the internal axial passage. The access opening has an imaginary access axis extending transversely relative to the imaginary body axis, and a length extending axially relative to the imaginary body axis. The body conduit, the axial hub, the transverse hub, and the access window are integrally and monolithically formed as a single, one-piece component. The cross-sectional dimension of the first axial hub opening is different than the cross-sectional dimension of the second axial hub opening. The first imaginary axial hub axis is unaligned with and parallel to the second imaginary axial hub axis.

DETAILED DESCRIPTION OF THE DISCLOSURE

Figure 1:
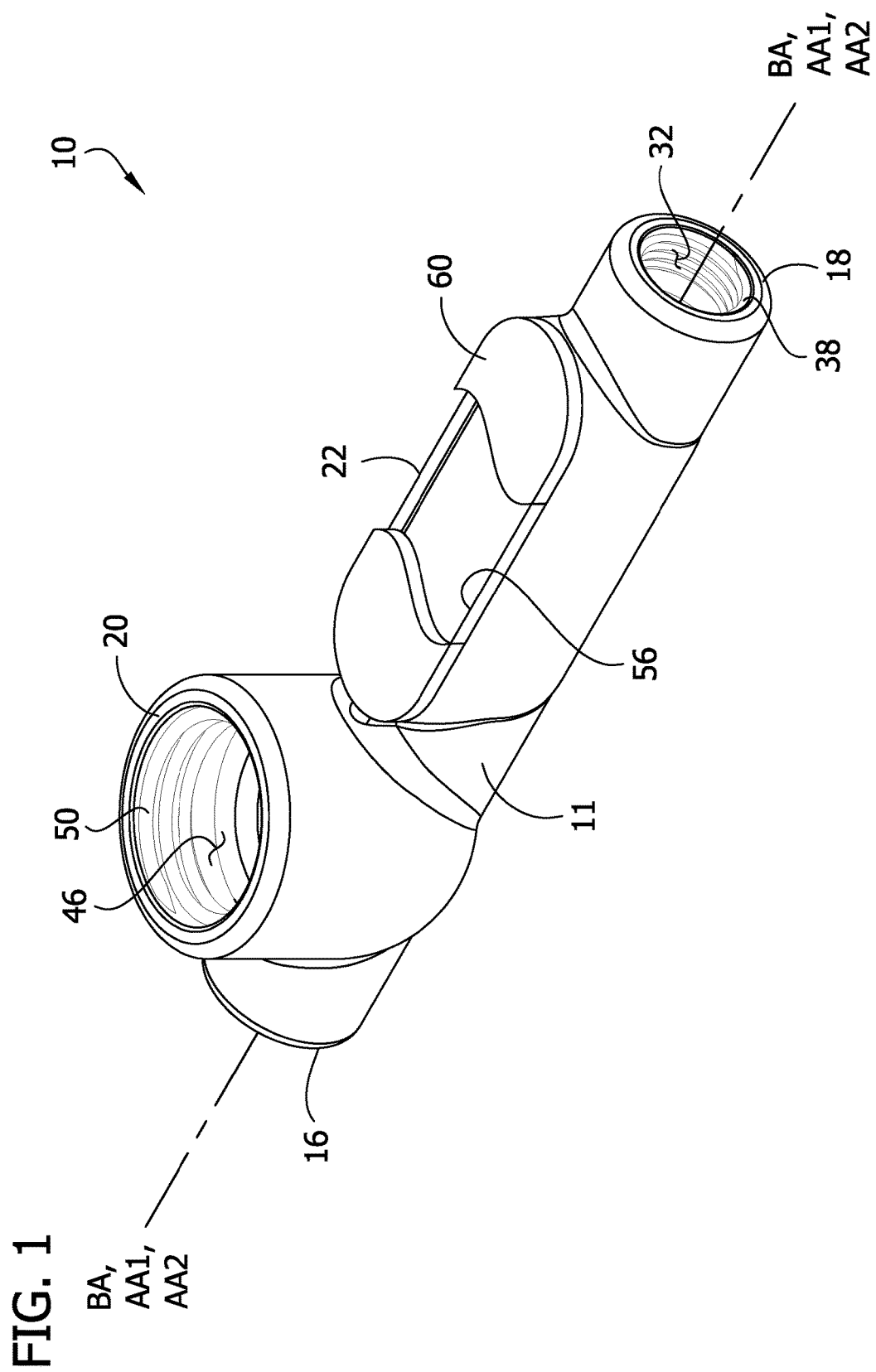
FIG. 1 is a perspective of one embodiment of a conduit outlet body constructed according to the teachings of the present disclosure.
Figure 2:
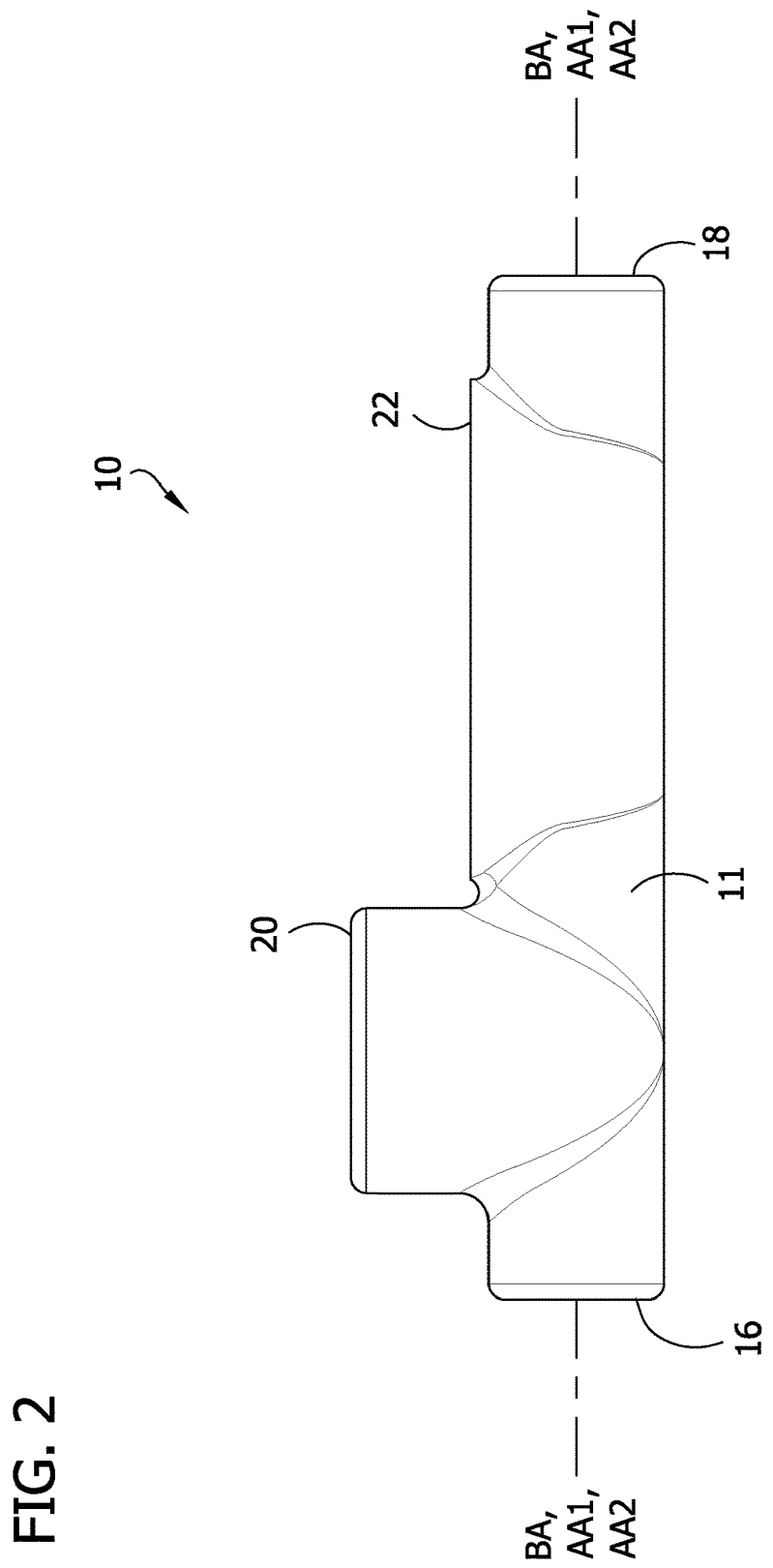
FIG. 2 is a front elevational view of the conduit outlet body in FIG. 1 with a cover plate removed.
Figure 3:
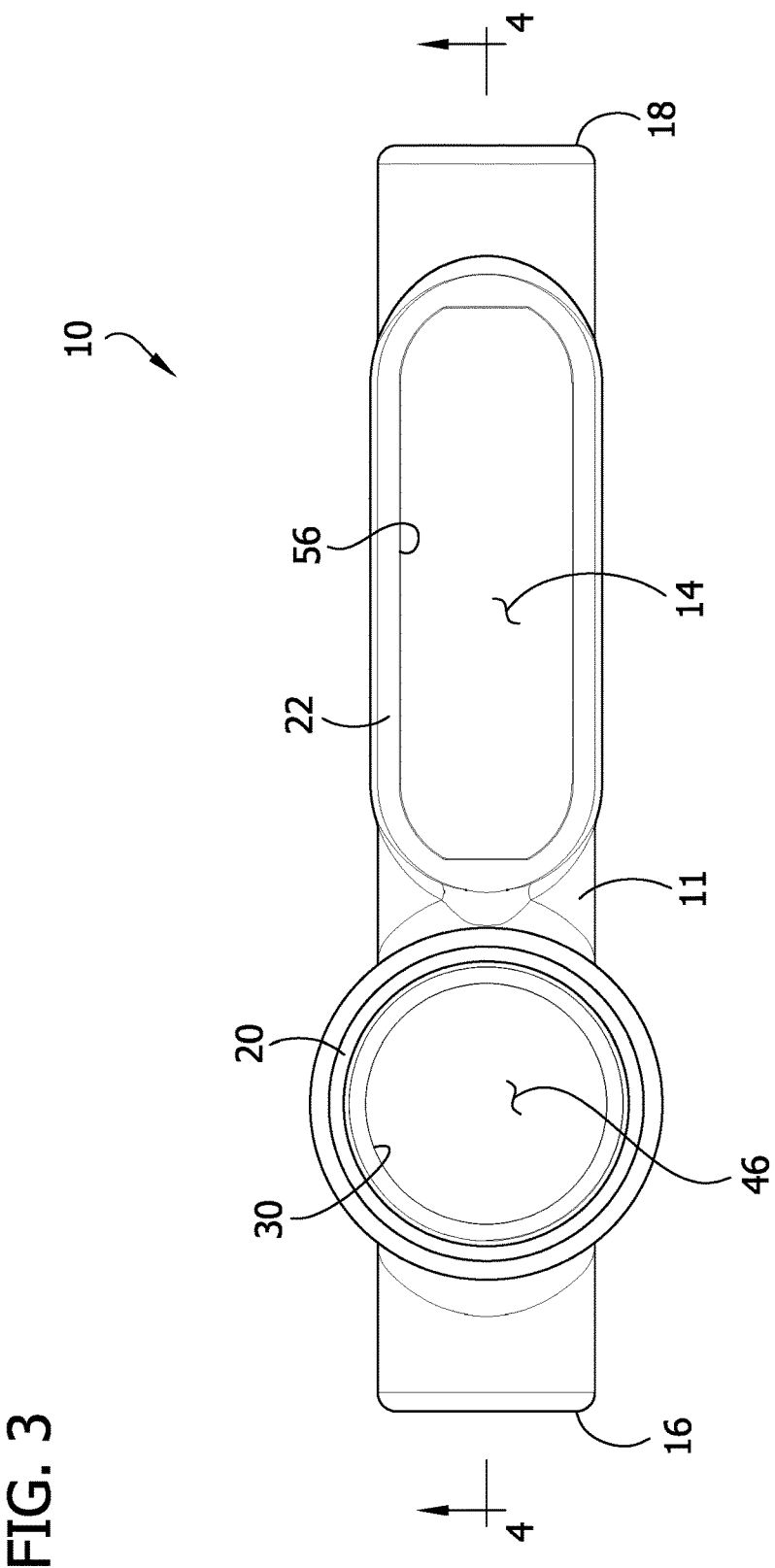
FIG. 3 is a top plan view of the conduit outlet body in FIG. 1 with the cover plate removed.

Referring to FIGS. 1-4, an illustrated embodiment of a conduit outlet body constructed according to the teachings set forth in the present application is generally indicated at reference numeral 10. The illustrated conduit outlet body 10 has first and second axial ends, and an imaginary body axis BA extending between the first and second axial ends. The conduit outlet body 10 comprises a body conduit 11 defining an internal axial passage 14 (FIG. 4) extending axially along the conduit outlet body. The conduit outlet body 10 further comprises a first axial hub 16 at the first axial end; a second axial hub 18 at the second axial end; a transverse hub 20 extending transversely relative to the body axis BA; and an access window 22 extending transversely relative to the body axis. This illustrated conduit outlet body 10 is generally configured as a TF-shaped conduit outlet body. In other embodiments, the conduit outlet body may have a different configuration, such as a C-shaped, T-shaped, or LB shaped conduit outlet body. In the illustrated embodiment, the body conduit 11, the first and second axial hubs, 16, 18, respectively, the transverse hub 20, and the access window 22 are monolithically and integrally formed as a single, one-piece component. In one example, the single, one-piece component may be formed from, as an example, malleable iron, aluminum, polyvinylchloride, plastic, cast aluminum, or cast iron.

The internal axial passage 14 is in communication with and interconnects the first and second axial hubs 16, 18, respectively, the transverse hub 20, and the access window 22. The illustrated internal axial passage 14 is generally elongate and is sized to receive one or more wires or cables therein. It is understood that the internal axial passage 14 may be of other shapes and dimensions without departing from the scope of the present disclosure. For example, the shape and dimension of the internal axial passage may be determined from the configuration of the conduit system of the intended function of the conduit outlet body, including the shape of the conduit outlet body.

Figure 4:
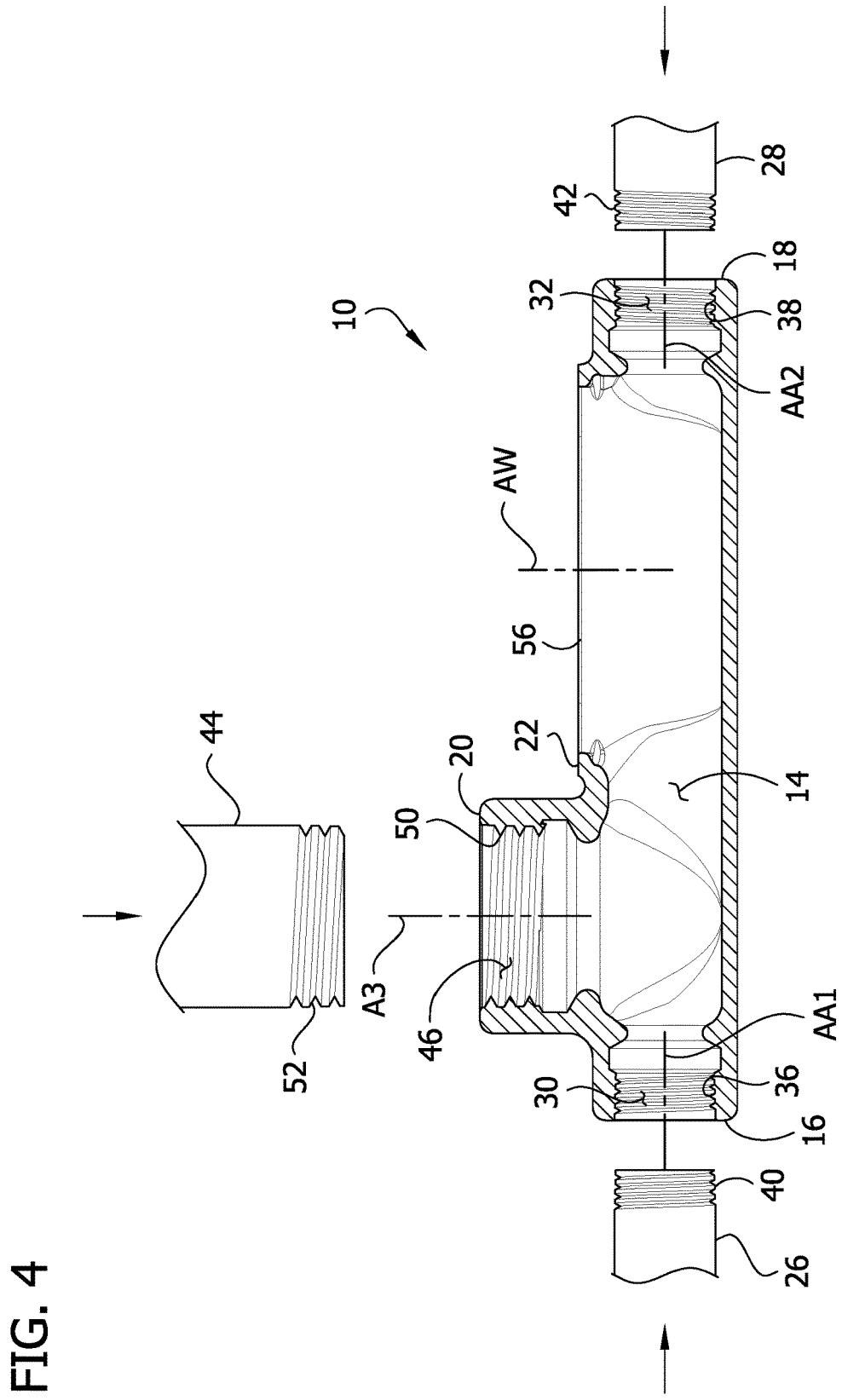
FIG. 4 is a sectional view of the conduit outlet body taken in the plane defined by the line 4-4 in FIG. 2 with a cover plate removed, showing electrical conduits being inserted into respective axial hubs.

In the illustrated embodiment, the first and second axial hubs 16, 18, respectively, are at the respective first and second axial ends of the conduit outlet body 10. In one or more embodiments, the conduit outlet body 10 may include more than two axial hubs or one axial hub at one or more of the first and second axial ends. As shown in FIG. 4, the first and second axial hubs 16, 18 are configured to connect to respective first and second axial electrical conduits 26, 28 (e.g., electrical raceway conduits) so that the first and second axial electrical conduits are in communication with the internal axial passage 14. In the illustrated embodiment, the first and second axial hubs 16, 18 define respective first and second axial hub openings 30, 32 in which the first and second electrical raceway conduits 26, 28 are secured. The first and second axial hub openings 30, 32 have imaginary axes AA1, AA2 extending along the body axis BA. The imaginary axes AA1, AA2 may be coaxially aligned with the body axis BA and/or the internal axial passage 14, such as in the illustrated embodiment.

The illustrated first and second axial hub openings 30, 32 have generally circular cross-sectional shapes. In the illustrated embodiment, the first and second axial hubs 16, 18 include female threads 36, 38, respectively, (i.e., the axial hub openings 30, 32 are threaded) that thread onto male threads 40, 42 (i.e., threaded ends) of the corresponding first and second axial electrical conduits 26, 28 to secure the conduits to the conduit outlet body 10. As explained in more detail below, in one or more embodiments at least one of the axial hubs 16, 18 may be unthreaded. The first axial hub opening 30 has a first cross-sectional dimension (e.g., a first diameter), and the second axial hub opening 32 has a second cross-sectional dimension (e.g., a second diameter). The first and second axial hub openings 30, 32, respectively, may have equal cross-sectional dimensions, or the first and second cross-sectional dimensions may be different. In one example, the first and second openings 30, 32 may have threaded inner trade diameters of about ¾ in (21 mm Metric Trade Size) or about 1 in (27 mm Metric Trade Size).

In the illustrated embodiment, the transverse hub 20 is configured to connect to a transverse electrical conduit 44 (e.g., an electrical conduit) so that the transverse electrical conduit is in communication with the internal axial passage 14. In the illustrated embodiment, the transverse hub 20 defines a transverse hub opening 46 in which the transverse electrical conduit 44 is secured. The transverse hub opening 46 has an axis A3 extending transversely (e.g., perpendicular to) with respect to the internal axial passage 14 and/or the body axis AB. The illustrated transverse hub 20 is intermediate the first and second axial hubs 16, 18 and closer to the first axial hub compared to the second axial hub. The illustrated transverse hub opening 46 has a circular cross-sectional shape. In the illustrated embodiment, the transverse hub 20 includes a female thread 50 respectively, (i.e., the transverse hub opening 46 is threaded) that threads onto a male thread 52 (i.e., a threaded end) of the transverse electrical conduit 44 to secure the conduit to the conduit outlet body 10. As explained in more detail below, in one or more embodiments the transverse hub 20 may be unthreaded and configured to receive and secure an electrical conduit therein.

The transverse hub opening 46 has a transverse cross-sectional dimension (e.g., a transverse diameter). In one embodiment, the transverse hub opening 46 has a transverse cross-sectional dimension (e.g., a transverse diameter) that is greater than at least one of the first and second cross-sectional dimensions of the respective first and second axial hub openings 30, 32. In the illustrated embodiment, the transverse hub opening 46 has a transverse diameter that is greater than both of the first and second axial hub openings 30, 32. For example, the cross-sectional dimension of the transverse hub opening 46 may be between about 0.25 in (6.35 mm) to about 1.0 in (25.4 mm) greater than the cross-sectional dimensions of the first and second axial hub openings 30, 32. In one example, the transverse hub opening 46 may have a threaded inner trade diameter of 1½ in (41 mm Metric Trade Size), and the first and second openings 30, 32 may have threaded inner trade diameters of about ¾ in (21 mm Metric Trade Size) or about 1 in (27 mm Metric Trade Size). In this example, the transverse conduit 44 may comprise a light fixture stanchion, whereby the transverse hub opening 46 is configured to mate with the light fixture stanchion 44. A light fixture (not shown) may be mounted adjacent the opposite end of the light fixture stanchion 44.

As shown in FIG. 4, the access window 22 defines an access opening 56 having an axis AW that extends transversely (e.g., perpendicular to) with respective to the internal axial passage 14 and/or the body axis BA. The access window 22 is generally aligned with the transverse hub 20 along the body axis AB. In other words, the access window 22 and the transverse hub 20 are on the same side of the body conduit 11. The illustrated access window 22 is intermediate the first and second axial hubs 16, 18, closer to the second axial hub compared to the first axial hub, and intermediate the second axial hub and the transverse hub 20. The illustrated access opening 56 has an elongate shape (e.g., oval, racetrack, or rectangular shaped) having a length extending along the axis BA. As shown in FIG. 1, a movable cover plate 60 is secured to the access window 22 to cover the access opening 56. The cover plate 60 may be selectively removable from the access window 22 (e.g., secured by one or more screws, wedge nuts, or in other ways) and/or may be selectively pivotable relative to the window to open the access window and allow access to the wires in the internal passage 14.

In an exemplary method the conduit outlet body 10 is used to form an electrical conduit run, such as the run shown in FIG. 4. The first axial electrical conduit 26 is connected to (e.g., threaded in or otherwise inserted and secured) the first axial hub 16 so that the first electrical conduit is in communication with the internal axial passage 14. The second axial electrical conduit 28 is connected to (e.g., threaded in or otherwise inserted and secured) the second axial hub 18 so that the second electrical conduit is in communication with the internal axial passage 14. The transverse electrical conduit 44 is connected to (e.g., threaded in or otherwise inserted and secured) the transverse hub 20 so that the transverse electrical conduit is in communication with the internal axial passage 14. Electrical wires or cables are fed through the first and second axial conduits 26, 28, respectively, the transverse conduit 44, and the conduit outlet body 10 to wire an electrical device (e.g., light fixture) mounted on the transverse conduit. A plurality of the conduit outlet bodies 10 may be used to wire a plurality of the electrical devices along the run.

Conventionally, the openings of the first and second axial hubs and the transverse hubs have the same cross-sectional dimensions, such as threaded inner trade diameters of 1½ in (41 mm Metric Trade Size). In certain applications, the threaded openings of the first and second axial hubs need to be reduced to smaller cross-sectional dimensions, such as threaded inner trade diameters of about ¾ in (21 mm Metric Trade Sizes). For example, in stanchion light mounted applications, threaded reducers may need to be threaded into the first and second axial hubs to mate with ¾ in (21 mm) trade size electrical conduits. The illustrated conduit outlet body 10 eliminates the need to use threaded reducers in these certain applications to reduce the cross-sectional dimensions of the openings of the first and second axial hubs. The use of reducers may lead to corrosion and water ingress at the connections.

Referring to FIGS. 5-8, another illustrated embodiment of a conduit outlet body constructed according to the teachings set forth in the present application is generally indicated at reference numeral 110. The illustrated conduit outlet body 110 has first and second axial ends, and an imaginary body axis BA extending between the first and second axial ends. The conduit outlet body 110 comprises a body conduit 111 defining an internal axial passage 114 (FIG. 8) extending axially along the conduit outlet body. The outlet body 110 further generally comprises a first axial hub 116 at the first axial end; a second axial hub 118 at the second axial end; a transverse hub 120 on the body conduit; and an access window 122 on the body conduit. In the illustrated embodiment, the body conduit 111, the first and second axial hubs, 116, 118, respectively, the transverse hub 120, and the access window 122 are monolithically and integrally formed as a single, one-piece component. In one example, the single, one-piece component may be formed from, as an example, malleable iron, aluminum, polyvinylchloride, plastic, cast aluminum, or cast iron.

The internal axial passage 114 is in communication with and interconnects the first and second axial hubs 116, 118, respectively, the transverse hub 120, and the access window 122. The illustrated internal axial passage 114 is generally elongate and is sized to receive one or more wires or cables therein. It is understood that the internal axial passage 114 may be of other shapes and dimensions without departing from the scope of the present disclosure.

In the illustrated embodiment, the first and second axial hubs 116, 118, respectively, are at the respective first and second axial ends. In one or more embodiments, the conduit outlet body 110 may include more than two axial hubs or one axial hub adjacent one or more of the first and second axial ends of the body conduit 111.

Figure 8:
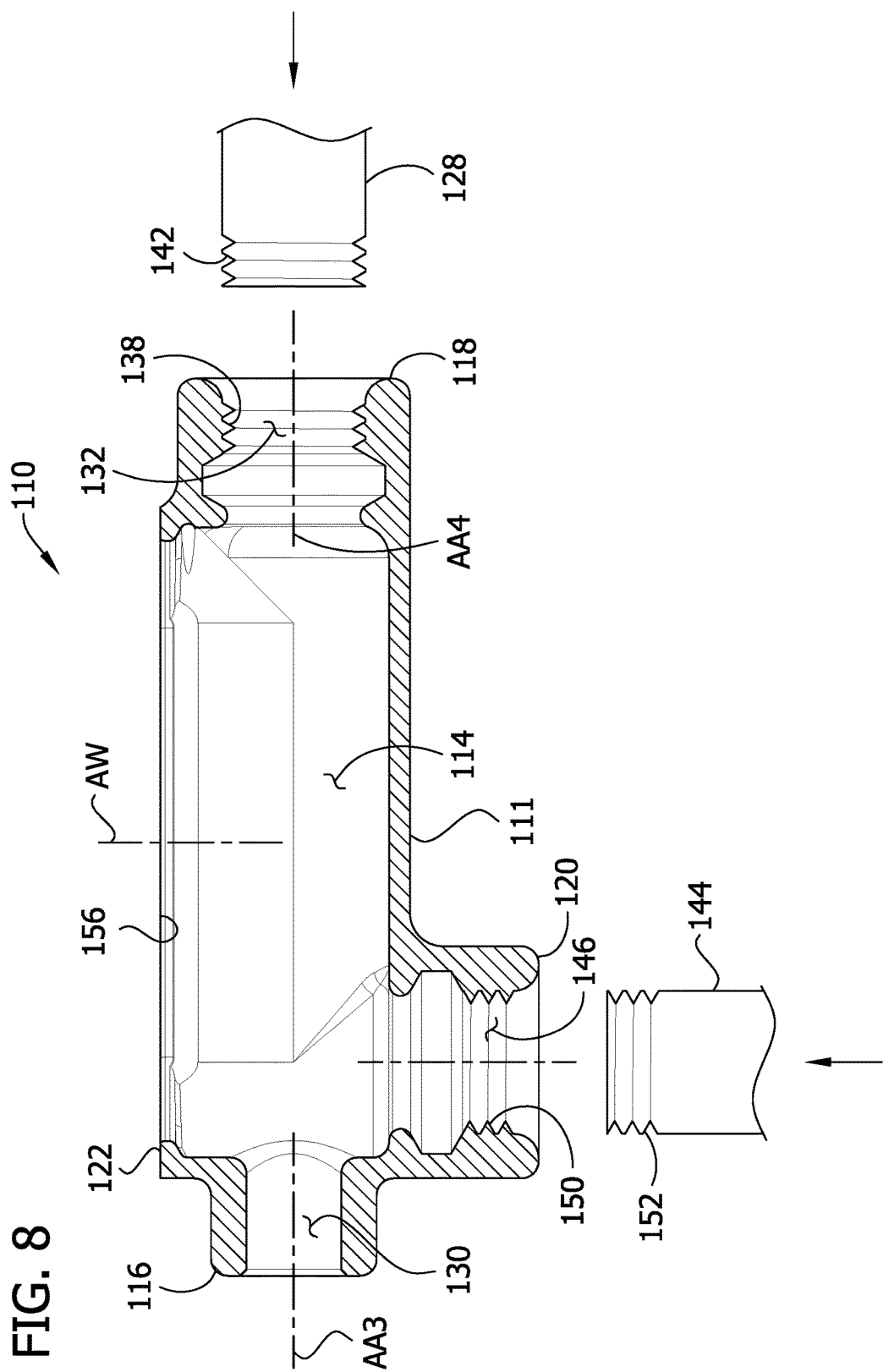
FIG. 8 is a sectional view of the conduit outlet body taken in the plane defined by the line 8-8 in FIG. 7 with the cover plate removed, showing electrical conduits being inserted into an axial hub.

As shown in FIG. 8, the second axial hub 118 is configured to connect to an axial conduit 128 (e.g., electrical raceway conduit) so that the axial electrical conduit is in communication with the internal axial passage 114. In the illustrated embodiment, the second axial hub 118 defines a second axial hub opening 132 in which the second electrical raceway conduit 128 is secured. The second axial hub opening 132 has an imaginary axis AA4 extending along the body axis BA2. The axis AA4 may be coaxially aligned with the body axis BA and/or the internal axial passage 114, such as in the illustrated embodiment. The illustrated second axial hub opening 132 has a generally circular cross-sectional shape and includes female threads 128 (i.e., the axial hub opening 132 is threaded) that thread onto male threads 142 (i.e., threaded end) of the second axial electrical conduit 128 to secure the conduit to the conduit outlet body 110. As explained in more detail below, in one or more embodiments the axial hub 118 may be unthreaded and configured to receive and secure an electrical conduit therein. The second axial hub opening 132 has a second cross-sectional dimension (e.g., a second diameter), which in one example, may have threaded inner trade diameter of about ¾ in (21 mm Metric Trade) or about 1 in (27 mm Metric Trade Size).

Unlike the first conduit outlet body 10, the first axial hub 116 of the present conduit outlet body 110 defines a first axial hub opening 130 that is unthreaded (i.e., free from threads). Accordingly, the first axial hub 116 is free from female threads for connection to a threaded electrical conduit. In this embodiment, the first axial hub 116 is not configured to connect to an electrical conduit, but instead, the first axial hub opening 130 is configured as a drain opening for draining water and/or other liquid that has entered the conduit outlet body 110. In other embodiments, the first axial hub 116 may be threaded while still configured as a drain opening for draining water and/or other liquid that has entered the conduit outlet body 110. The first axial hub opening 130 has an imaginary axis AA3 extending along the body axis BA. The axis AA3 may be coaxially aligned with the body axis BA and/or the internal axial passage 114, such as in the illustrated embodiment. The first axial hub opening 130 has a cross-sectional dimension (e.g., a cross-sectional diameter), which in one embodiment is less than the cross-sectional diameter of the second axial hub opening 132. For example, the cross-sectional diameter of the first axial hub opening 130 may be from about ⅛ in to about ¼ in maximum providing a weep hole as discussed in NEC 314.15. In another embodiment, the first axial hub opening 130 can be threaded to accept a baffle or drainage fitting, such as a baffle or drainage fitting that includes a ½ in thread.

Referring to FIG. 8, in the illustrated embodiment, the transverse hub 120 is configured to connect to a transverse electrical conduit 144 (e.g., an electrical device conduit) so that the transverse electrical conduit is in communication with the internal axial passage 114. In the illustrated embodiment, the transverse hub 120 defines a transverse hub opening 146 in which the transverse electrical conduit 144 is secured. The transverse hub opening 146 has an axis A4 extending transversely (e.g., perpendicular to) with respect to the internal axial passage 114 and the body axis AB2. The illustrated transverse hub 120 is intermediate the first and second axial hubs 116, 118 and closer to the first axial hub compared to the second axial hub. The illustrated transverse hub opening 46 has a circular cross-sectional shape. In the illustrated embodiment, the transverse hub 120 includes a female thread 150 (i.e., the transverse hub opening 146 is threaded) that threads onto a male thread 152 (i.e., a threaded end) of the transverse electrical conduit 144 to secure the conduit to the conduit outlet body 110. As explained in more detail below, in one or more embodiments the transverse hub 120 may be unthreaded and configured to receive and secure an electrical conduit therein. The transverse hub opening 146 has a transverse cross-sectional dimension (e.g., a transverse diameter). In one embodiment, the transverse hub opening 146 has a cross-sectional dimension (e.g., a transverse diameter) that is greater than at least one of the cross-sectional dimensions of the respective first and second axial hub openings 130, 132. In the illustrated embodiment, the transverse hub opening 146 has an inner trade diameter that is greater than the first axial hub opening 130, and equal to the inner trade diameter of the second axial hub opening 132.

Figure 5:
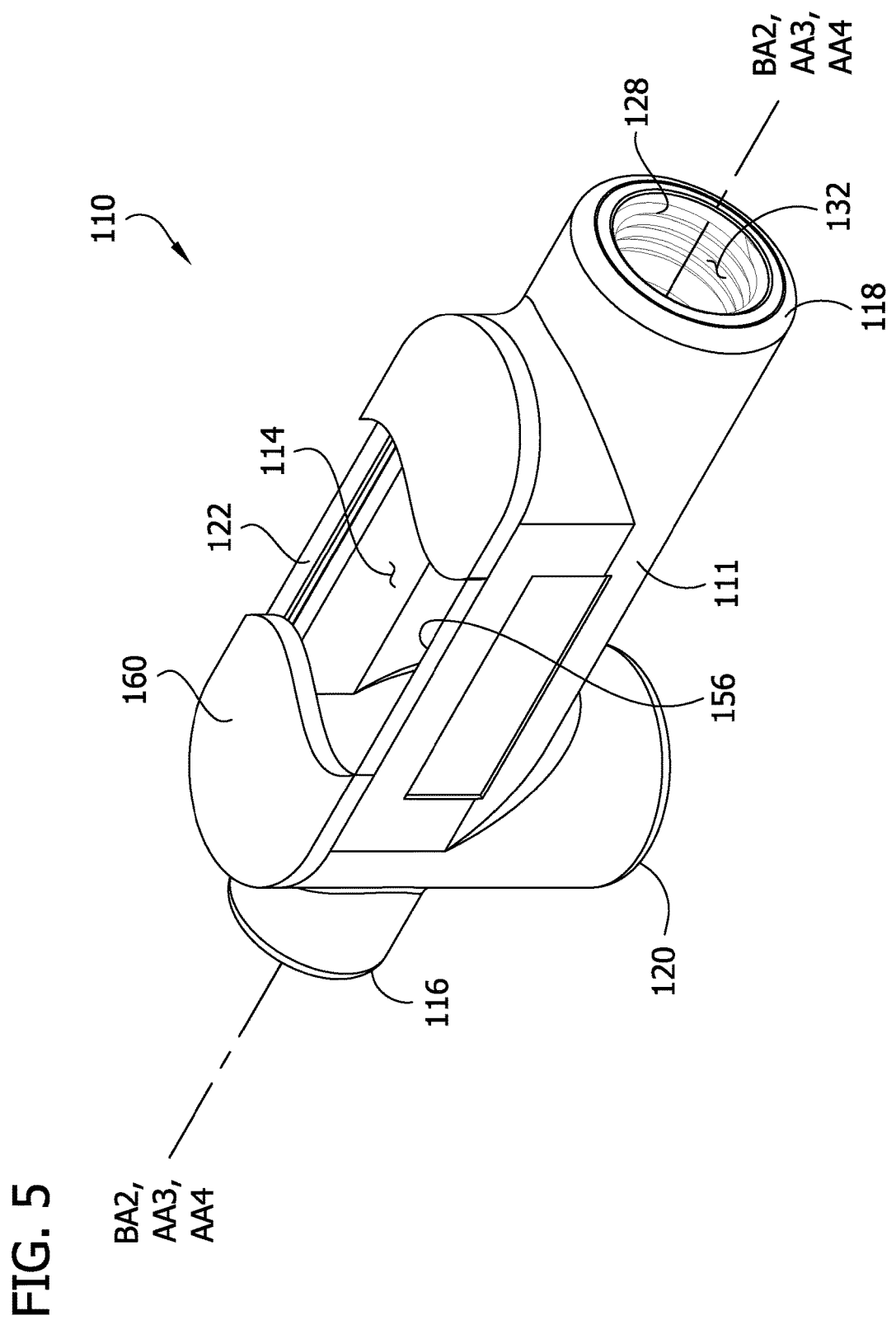
FIG. 5 is a perspective of another embodiment of a conduit outlet body constructed according to the teachings of the present disclosure.
Figure 6:
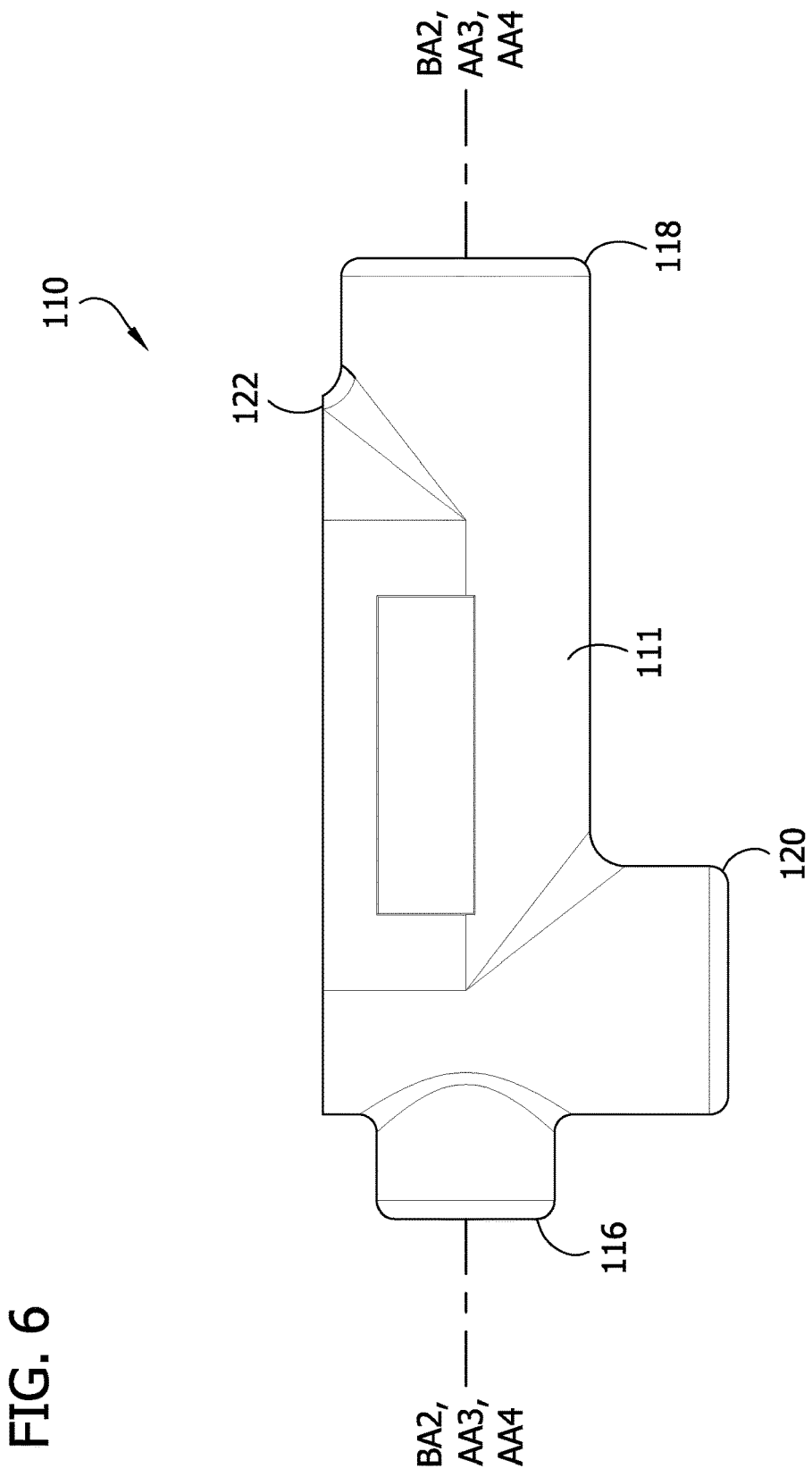
FIG. 6 is a front elevational view of the conduit outlet body in FIG. 5 with the cover plate removed.
Figure 7:
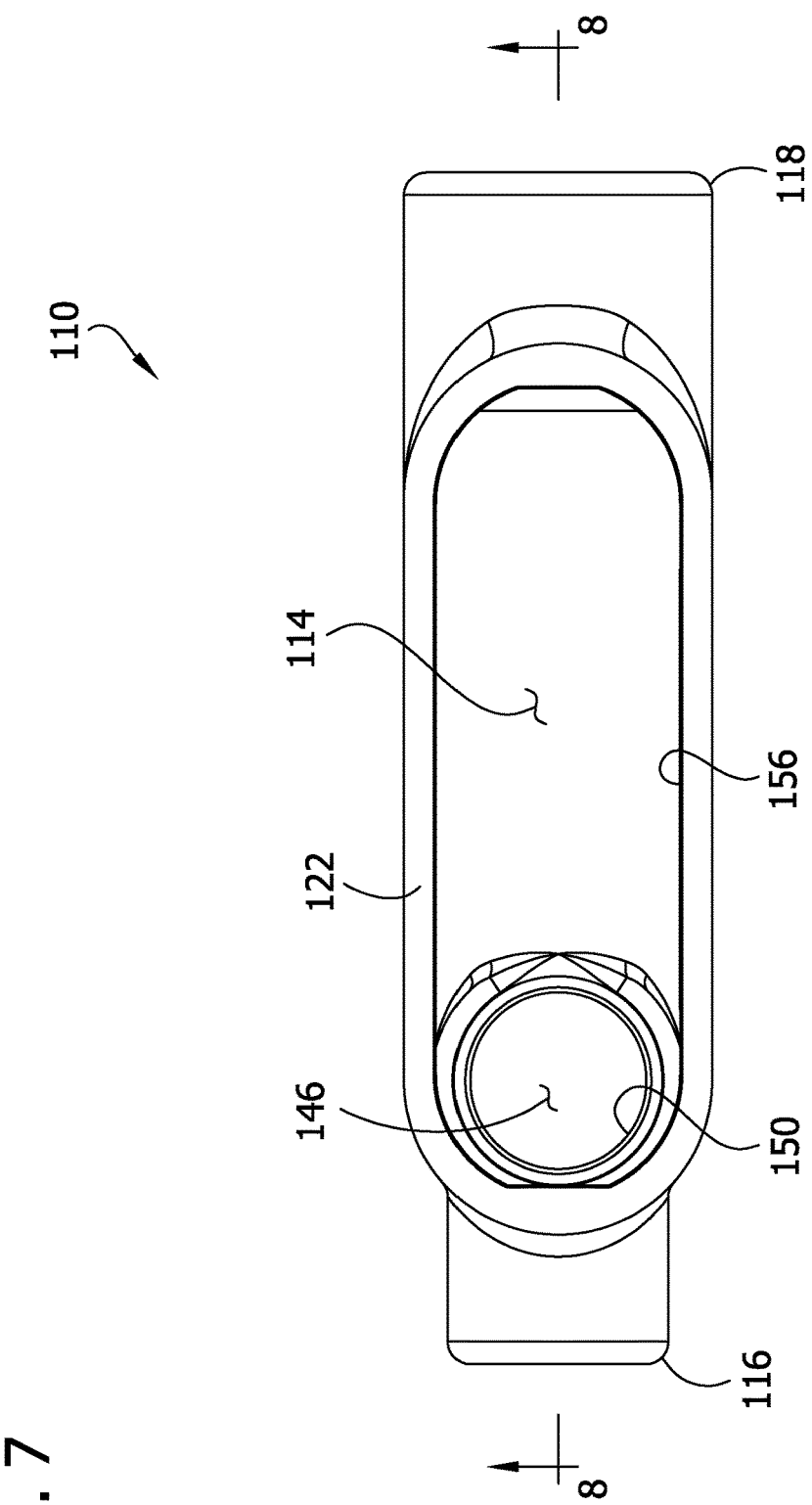
FIG. 7 is a top plan view of the conduit outlet body in FIG. 5 with the cover plate removed.

As shown in FIG. 8, the access window 122 defines an access opening 156 having an axis AW that extends transversely (e.g., perpendicular to) with respect to the internal axial passage 114 and the body axis BA2. The access window 122 is generally diametrically opposite the transverse hub 120 relative to the body axis BA2. In other words, the access window 122 and the transverse hub 120 are on opposite sides of the body conduit 111. In generally, the illustrated conduit outlet body 110 is configured as a TB-shaped conduit outlet body. The illustrated access window 122 is intermediate the first and second axial hubs 116, 118. The illustrated access opening 156 has an elongate shape (e.g., oval, racetrack, or rectangular shaped) having a length extending along the axis BA2 of the body conduit 111. As shown in FIG. 5, a movable cover plate 160 is secured to the access window 122 to cover the access opening 156. The cover plate 160 may be selectively removable from the access window 122 (e.g., secured by one or more screws, wedge nuts, or in other ways) and/or may be selectively pivotable relative to the window to open the access window and allow access to the wires in the internal passage 114.

In an exemplary method, the conduit outlet body 110 is used to form an electrical conduit run, such as the run shown in FIG. 8. The second axial electrical conduit 128 is connected to (e.g., threaded in or otherwise inserted and secured) the second axial hub 118 so that the second electrical conduit is in communication with the internal axial passage 114. The transverse electrical conduit 144 is connected to (e.g., threaded in or otherwise inserted and secured) the transverse hub 120 so that the transverse electrical conduit is in communication with the internal axial passage 114. Electrical wires or cables may be feed through the second axial conduit 128, the transverse conduit 144, and the conduit outlet body 110.

Conventionally, in a TB-shaped conduit outlet body, the openings of the first and second axial hubs and the transverse hubs have the same cross-sectional dimensions, such as threaded inner trade diameters of 1½ in (41 mm Metric Trade Size). In certain applications, the threaded openings of the first axial hub opening 130 needs to be reduced to smaller cross-sectional dimensions, such as threaded inner diameters of about ½ in trade size (16 mm Metric trade size) to configure the TB-shaped conduit as an L-shaped conduit outlet body including a drain. The illustrated conduit outlet body 110 eliminates the need to use threaded reducers in these certain applications to reduce the cross-sectional dimension of the opening of the first axial hub. The use of reducers may cause corrosion and water ingress at the connections.

Figure 9:
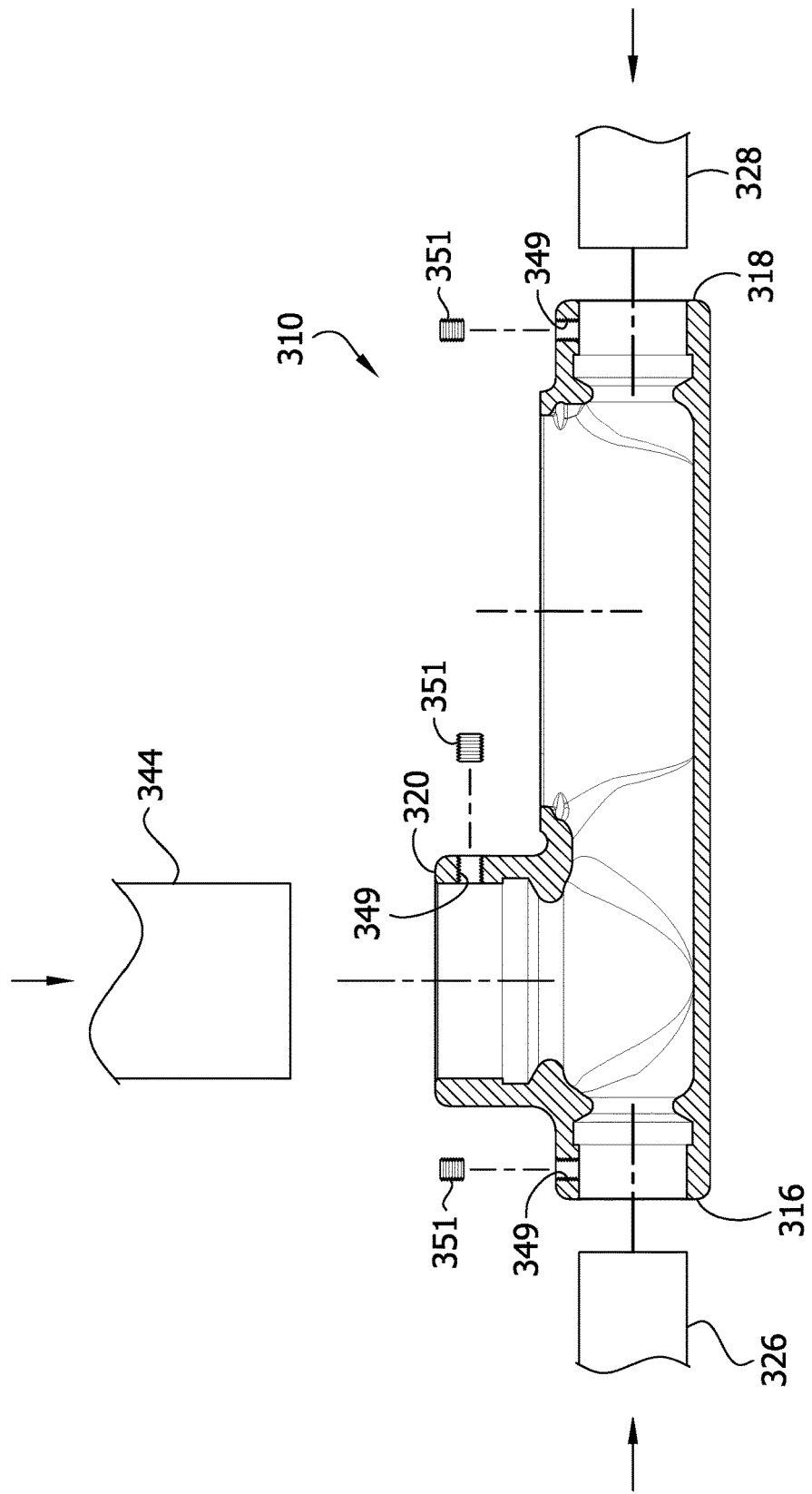
FIG. 9 is a sectional view of another embodiment of a conduit outlet body constructed according to the teachings of the present disclosure.

Referring to FIG. 9, another illustrated embodiment of a conduit outlet body constructed according to the teachings set forth in the present application is generally indicated at reference numeral 310. This illustrated conduit outlet body 310 is identical to the conduit outlet body 10 illustrated in FIGS. 1-4 other than as described below. Accordingly, unless otherwise indicated, the teachings of the conduit outlet body 10 apply equally to the present conduit outlet body 310. Unlike the conduit outlet body 10, axial hubs 316, 318 and transverse hub 320 of the present conduit outlet body are unthreaded. In this embodiment, the unthreaded hubs 316, 318, 320 are configured to slidably receive unthreaded (or threaded) respective electrical raceway conduits 326, 328, 344 therein. Each hub 316, 318, 320 defines a threaded transverse set screw opening 349 in which a corresponding set screw 351 is threadably received to secure the electrical raceway conduits 326, 328, 344 in the respective unthreaded hubs. The electrical raceway conduits 326, 328, 344 may be secured in the unthreaded hubs 316, 318, 320 in other ways.

Figure 10:
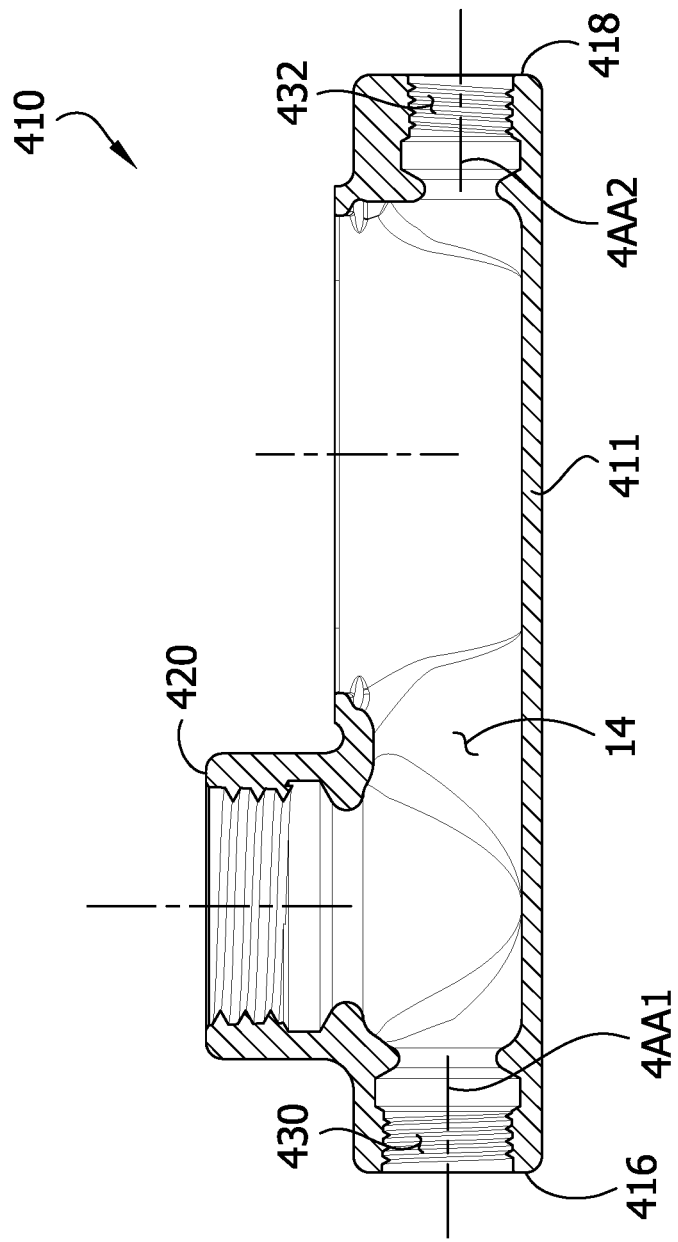
FIG. 10 is a sectional view of yet another conduit outlet body constructed according to the teachings of the present disclosure.

Referring to FIG. 10, another illustrated embodiment of a conduit outlet body constructed according to the teachings set forth in the present application is generally indicated at reference numeral 410. This illustrated conduit outlet body 410 is identical to the conduit outlet body 10 illustrated in FIGS. 1-4 other than as described below. Accordingly, unless otherwise indicated, the teachings of the conduit outlet body 10 apply equally to the present conduit outlet body 410. Unlike the conduit outlet body 10, first and second axial hub openings 430, 432 of the respective first and second axial hubs 416, 418 have different inner trade diameters. For example, the inner trade diameter of the second axial opening 432 may be less than the inner trade diameter of the first axial opening 430. In one example, the first axial opening 430 may have an inner trade diameter of about 1 in (27 mm Metric Trade Size) and the second axial opening 432 may have an inner trade diameter of about ¾ in (21 mm Metric Trade Size). The first and second axial openings 430, 432 may be of other sizes. In addition to having different sizes, the first and second axial openings 430, 432 have respective imaginary axes 4AA1, 4AA2 that are unaligned (offset) relative to one another. The imaginary axes 4AA1, 4AA2 are parallel to one another. Moreover, a lower surface of the conduit outlet body 410 is generally flat along its length, including the body conduit 411 and the axial hubs 416, 418 (i.e., the lower surfaces of the axial hubs are not offset from the lower surface of the body conduit 411). This configuration is unlike the first axial hub 116 of the conduit outlet body 110, which is offset from the lower surface of the body conduit 111. The conduit outlet body 410 may be suitable for mounting on a wall, for example.

Modifications and variations of the disclosed embodiments are possible without departing from the scope of the invention defined in the appended claims.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A conduit outlet body having first and second axial ends, and an imaginary body axis extending between the first and second axial ends, the conduit outlet body comprising:
   a body conduit defining an internal axial passage extending axially along the conduit outlet body;
   an axial hub at the first axial end of the conduit outlet body and defining an axial hub opening in communication with the internal axial passage, the axial hub opening having a cross-sectional dimension and an imaginary axial hub axis extending along the imaginary body axis;
   a transverse hub on the body conduit and having a transverse hub opening in communication with the internal axial passage, the transverse hub opening having a cross-sectional dimension and an imaginary transverse axis extending transversely relative to the imaginary body axis, wherein the transverse hub is configured to connect to a transverse electrical conduit so that the transverse electrical conduit is in communication with the internal axial passage; and
   an access window on the body conduit, the access window defining an access opening in communication with the internal axial passage, wherein the access opening has an imaginary access axis extending transversely relative to the imaginary body axis, and a length extending axially relative to the imaginary body axis,
   wherein the body conduit, the axial hub, the transverse hub, and the access window are integrally and monolithically formed as a single, one-piece component,
   wherein the cross-sectional dimension of the transverse hub opening is different than the cross-sectional dimension of the axial hub opening.

2. The conduit outlet body set forth in claim 1, wherein the axial hub is configured to connect to an axial electrical conduit so that the axial electrical conduit is in communication with the internal axial passage.

3. The conduit outlet body set forth in claim 2, wherein the cross-sectional dimension of the transverse hub opening is greater than the cross-sectional dimension of the axial hub opening.

4. The conduit outlet body set forth in claim 3, wherein the axial hub opening and the transverse hub opening are threaded and configured to threadably mate with the respective axial electrical conduit and the transverse electrical conduit.

5. The conduit outlet body set forth in claim 4, wherein the axial hub constitutes a first axial hub, and the axial hub opening constitutes a first axial hub opening, the conduit outlet body further comprising a second axial hub at the second axial end of the body conduit and defining a second axial hub opening in communication with the internal axial passage, the second axial hub opening having a cross-sectional dimension and an imaginary axial hub axis extending along the imaginary body axis, wherein the second axial hub opening is threaded and configured threadably mate with another axial electrical conduit.

6. The conduit outlet body set forth in claim 5, wherein the cross-sectional dimension of the transverse hub opening is greater than the cross-sectional dimension of the second axial hub opening.

7. The conduit outlet body set forth in claim 6, wherein the cross-sectional dimension of the transverse hub opening is between 0.25 in (6.35 mm) and 1.0 in (25.4 mm) greater than the cross-sectional dimensions of the first and second axial hub openings.

8. The conduit outlet body set forth in claim 6, wherein the first axial hub opening, the second axial hub opening, and the transverse hub opening have circular cross-sectional shapes.

9. The conduit outlet body set forth in claim 8, wherein the cross-sectional dimensions of the first and second axial hub openings are equal.

10. The conduit outlet body set forth in claim 9, wherein the transverse hub and the access window are generally aligned along the imaginary body axis.

11. The conduit outlet body set forth in claim 10, wherein the transverse hub is closer to the first axial hub compared to the second axial hub, wherein the access window is intermediate the transverse hub and the second axial hub.

12. The conduit outlet body set forth in claim 9, in combination with:
   the axial electrical conduits threaded in the respective first and second axial hubs; and
   the transverse electrical conduit threaded in the transverse hub.

13. The conduit outlet set forth in claim 12, in further combination with an electrical device mounted on the transverse electrical conduit.

14. The conduit outlet body set forth claim 3, wherein the axial hub opening and the transvers hub openings are unthreaded and configured to receive the respective axial and transverse electrical conduits therein.

15. The conduit outlet body set forth in claim 1, wherein the axial hub constitutes a first axial hub, and the axial hub opening constitutes a first axial hub opening, the conduit outlet body further comprising a second axial hub at the second axial end of the body conduit and defining a second axial hub opening in communication with the internal axial passage, the second axial hub opening having a cross-sectional dimension and an imaginary axial hub axis extending along the imaginary body axis, wherein the second axial hub opening is threaded and configured threadably mate with a second axial electrical conduit so that the second axial electrical conduit is in communication with the internal axial passage.

16. The conduit outlet body set forth in claim 15, wherein first axial hub opening constitutes a drain opening that is configured to accept a drainage fitting.

17. The conduit outlet body set forth in claim 16, wherein the cross-sectional dimension of the transverse hub opening is greater than the cross-sectional dimension of the first axial hub opening.

18. The conduit outlet body set forth in claim 16, wherein the cross-sectional dimension of the transverse hub opening is equal to the cross-sectional dimension of the second axial hub opening.

19. The conduit outlet body set forth in claim 1, further comprising a movable cover plate secured to the access window.

20. A conduit outlet body having first and second axial ends, and an imaginary body axis extending between the first and second axial ends, the conduit outlet body comprising:
   a body conduit defining an internal axial passage extending axially along the conduit outlet body;
   a first axial hub at the first axial end of the conduit outlet body and defining a first axial hub opening in communication with the internal axial passage, the first axial hub opening having a cross-sectional dimension and a first imaginary axial hub axis extending along the imaginary body axis;

a second axial hub at the second axial end of the conduit outlet body and defining a second axial hub opening in communication with the internal axial passage, the second axial hub opening having a cross-sectional dimension and a second imaginary axial hub axis extending along the imaginary body axis;

a transverse hub on the body conduit and having a transverse hub opening in communication with the internal axial passage, the transverse hub opening having a cross-sectional dimension and an imaginary transverse axis extending transversely relative to the imaginary body axis, wherein the transverse hub is configured to connect to a transverse electrical conduit so that the transverse electrical conduit is in communication with the internal axial passage; and an access window on the body conduit, the access window defining an access opening in communication with the internal axial passage, wherein the access opening has an imaginary access axis extending transversely relative to the imaginary body axis, and a length extending axially relative to the imaginary body axis, wherein the body conduit, the first and second axial hubs, the transverse hub, and the access window are integrally and monolithically formed as a single, one-piece component, wherein the cross-sectional dimension of the first axial hub opening is different than the cross-sectional dimension of the second axial hub opening, wherein the first imaginary axial hub axis is unaligned with and parallel to the second imaginary axial hub axis.

* * * * *